United States Patent Office.

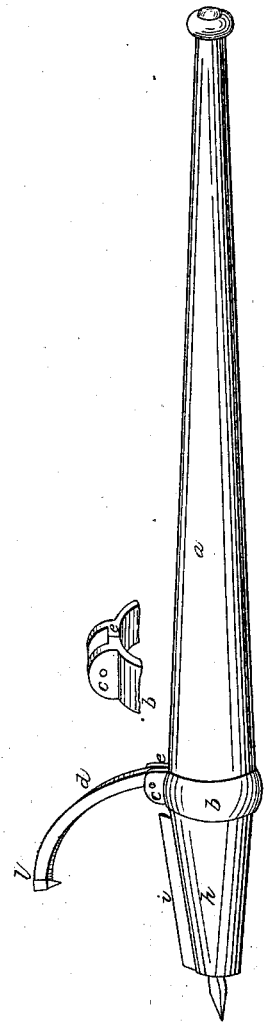

JOEL A. HOWE, OF BANGOR, MAINE.

Letters Patent No. 68,878, dated September 17, 1867.

---

IMPROVEMENT IN CANT-HOOKS.

---

*The Schedule referred to in these Letters Patent and making part of the same.*

---

TO ALL WHOM IT MAY CONCERN:

Be it known that I, JOEL A. HOWE, of Bangor, in the county of Penobscot, and State of Maine, have invented a new and Improved Cant-Dog; and I do hereby declare that the following is a full and exact description of the same, reference being had to the accompanying drawings, and to the letters of reference marked thereon.

This invention consists of a pick hand-spike, in combination with a cant-dog, for rolling logs and other timber, said hand-spike being provided with a stop for preventing said dog from striking it, and with a lip to act in connection with said dog, as will hereinafter more fully appear.

To enable others skilled in the art to make and use my invention, I will now proceed to describe its construction and operation.

$a$ represents the stock of a hand-spike, of the usual construction and material. At a suitable distance from the lower end thereof is a ring, $b$, provided with lugs $c$, between which is pivoted the dog $d$. Between the lugs $c$, at the upper corner thereof, the material of the ring $b$ projects outward, forming the stop $e$, the function of which is to prevent the dog from coming in contact with the stock when retracted, and abrading its surface and otherwise injuring it, more or less. $h$ represents a ferrule, enclosing the lower end of the stock, which ferrule is provided with the lip $i$, extending in a straight line from one end of the ferrule to the other, and in the plane of action of the dog $d$, or nearly so. This lip, when forced into the log, by pressure on the stock after the dog has taken hold, prevents the stock from slipping on the log, as it is very likely to do, if merely held in contact therewith by pressure, without the aid of any sharp instrument to penetrate the surface of the timber. The outer end of the dog is enlarged, as shown, and upon the enlargement is formed the bill $k$. The shoulders $l$ on the end of the dog prevent the bill from burying itself too deeply in the wood, and render it easy of extrication therefrom.

Having thus fully described my invention, what I claim as new, and desire to secure by Letters Patent, is—

The lip $i$, in combination with dog $d$, substantially as set forth.

JOEL A. HOWE.

Witnesses:
NATHAN L. PERKINS,
DANIEL SMITH, Jr.